United States Patent

Springer et al.

[11] Patent Number: 5,246,733
[45] Date of Patent: Sep. 21, 1993

[54] METHOD OF PRODUCING OPTICAL WAVEGUIDES ON A SUBSTRATE

[75] Inventors: Johann Springer, Aichwald; Klaus-Dieter Matthies, Möglingen, both of Fed. Rep. of Germany

[73] Assignee: Alcatel N.V., Amsterdam, Netherlands

[21] Appl. No.: 884,334

[22] Filed: May 18, 1992

[30] Foreign Application Priority Data

May 18, 1991 [DE] Fed. Rep. of Germany ....... 4116432

[51] Int. Cl.$^5$ .............................................. B05D 5/06
[52] U.S. Cl. .................................. 427/162; 156/643; 427/165; 427/261; 427/264; 427/265; 427/307; 427/375; 427/376.2; 427/385.5; 427/389.7; 427/389; 427/407.1; 427/407.2; 427/419.2; 427/419.3; 427/419.5; 427/596
[58] Field of Search ..................... 427/162, 165, 407.2, 427/407.1, 389.7, 385.5, 307, 596, 261, 264, 265, 375, 376.2; 156/643

[56] References Cited

U.S. PATENT DOCUMENTS 4,004,851  1/1977  Negishi et al. ..................... 427/165
5,062,688  11/1991  Okuda et al. ..................... 427/165

FOREIGN PATENT DOCUMENTS 0331335  9/1989  European Pat. Off. .
59-097102  6/1984  Japan .

OTHER PUBLICATIONS

Optics Communications, Bd. 50, No. 3, Jun. 1984, Amsterdam, The Netherlands, pp. 154–156; S. Tomaru et al.: "Organic crystals growth . . .".

*Primary Examiner*—Janyce Bell
*Attorney, Agent, or Firm*—Spencer, Frank & Schneider

[57] ABSTRACT

In a method of producing a device having at least one optical waveguide on a substrate, two transparent layers are formed one on top of the other on the substrate. The material of the two layers is selected so that the melting point of the material of the second layer is lower than that of the material of the first layer, but has a higher refractive index than the first layer. After formation of the structure, a heating process is performed in which the material of the second layer melts and, due to surface tension, its surface, when seen in cross section, takes on the shape at least approximating the arc of a circle. With this cross-sectional shape, coupling of light waves into and out of an optical fiber is possible at one edge of the substrate after the end faces of the optical waveguide have been ground or polished.

16 Claims, 1 Drawing Sheet

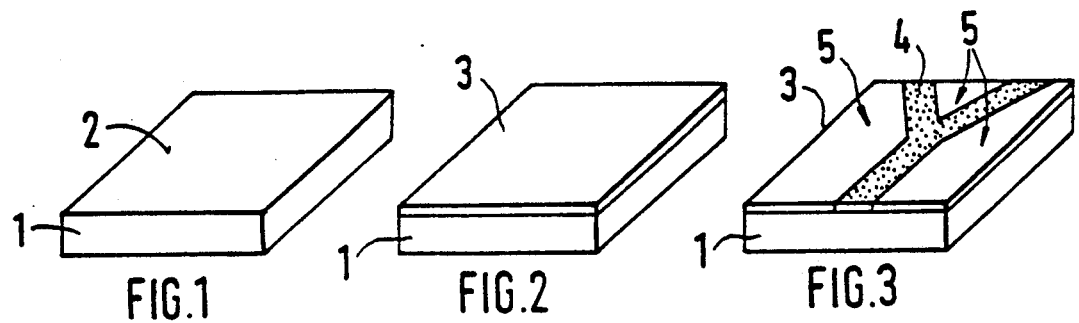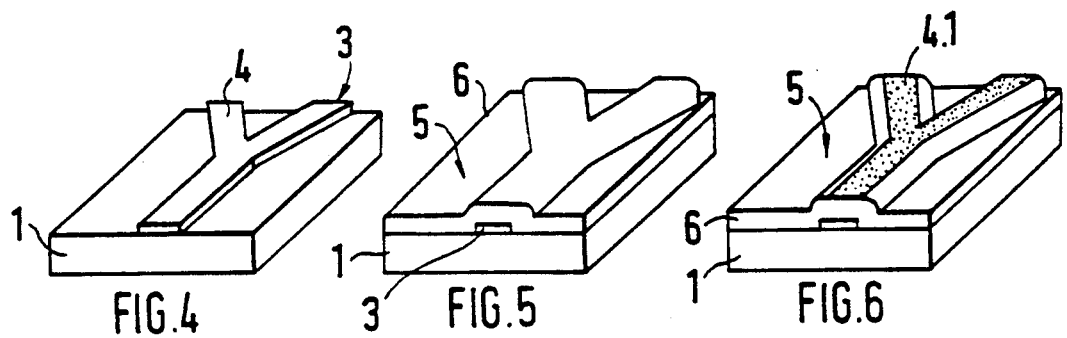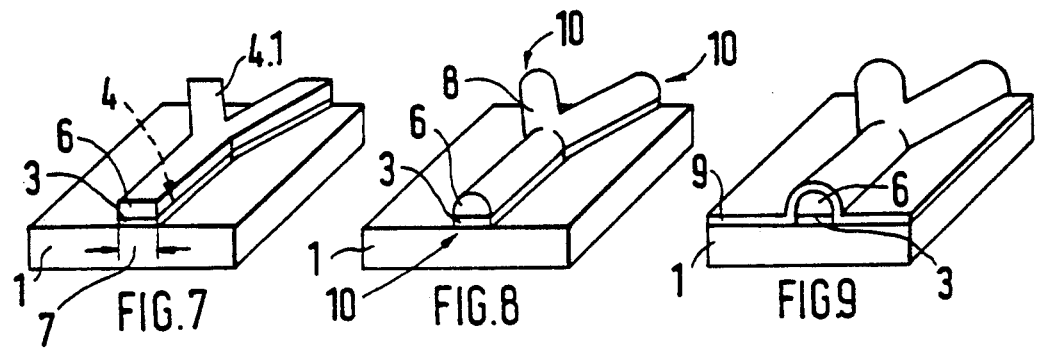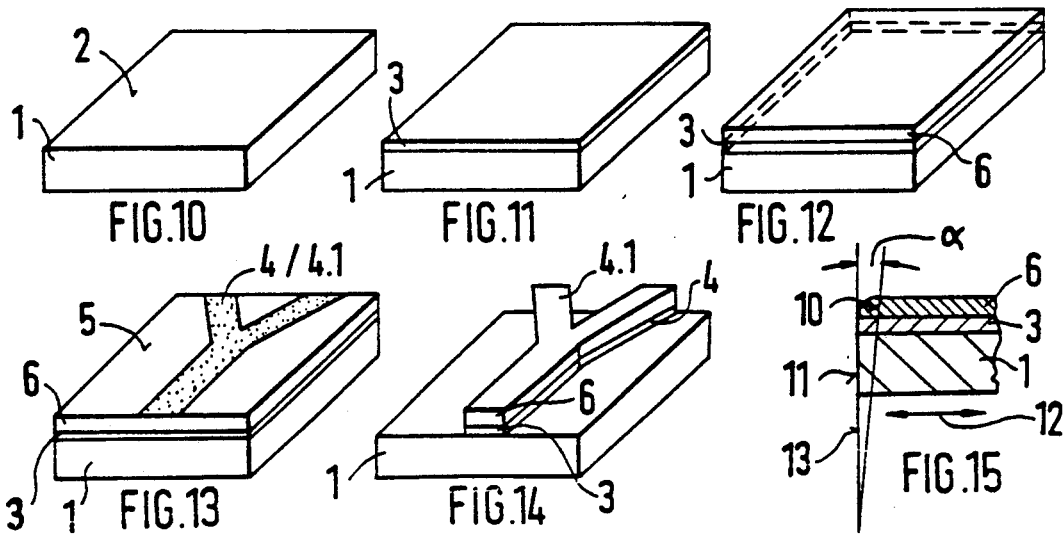

METHOD OF PRODUCING OPTICAL WAVEGUIDES ON A SUBSTRATE

CROSS REFERENCE TO RELATED APPLICATION

This application claims the priority of U.S. patent application Ser. No. P 41 16 432.6, filed May 18, 1991, in the Federal Republic of Germany, the subject matter of which is incorporated herein by reference.

BACKGROUND OF THE INVENTION

1. Field of the Invention

The present invention relates to a method of producing at least one optical waveguide in the form of a planar structure on a substrate.

2. Background Information

Such methods are known from the article entitled, "Bauelemente der integrierten Optik: eine Einführung," (translation: Integrated Optical Devices: An Introduction), published in the periodical "Laser und Optoelektronik" (translation: Lasers and Optoelectronics), No. 4/1986, pages 323-326. In epitaxial methods, raised optical waveguide structures extending along the surface of the substrate are obtained in that a layer is initially applied to a monocrystalline substrate and is structured photolithographically in the form of the desired optical waveguides, that is, the layer is removed at the locations where the optical waveguide is to be produced. Then an epitaxy method is employed to produce the waveguide as a monocrystalline layer in the form of the structure. Because of the materials to be employed for the substrate, and light waves with substantially coinciding lattice constants which additionally must have different refractive indices, such epitaxial methods are limited at present to a few compounds. The monocrystalline optical waveguides produced by epitaxy generally have a cross section that is approximately adapted to a circular or semicircular shape so that the coupling in or out of light waves at the polished end faces poses relatively few problems.

In diffusion methods one obtains an optical waveguide cross section which is also a close approximation to a circular shape by diffusing doping materials into the substrate, that is, below the substrate surface. The coupling in and out of light waves at the polished end faces here again generally poses no particular problems.

If, however, only a coating method is employed such as, for example, the vapor deposition of a transparent layer and then the structuring of this layer by means of an etching process or by, for example, vapor-depositing a layer through a structured mask, optical waveguides are obtained which have an essentially rectangular cross section that is not well suited for coupling light waves into and out of, for example, an optical fiber.

SUMMARY OF THE INVENTION

It is therefore an object of the present invention to configure optical waveguides that have been produced by the application of a transparent layer so that it is easily possible to couple optical fibers at the ground or polished end faces of the waveguides.

This is accomplished by the method steps according to an embodiment of the invention which includes a method of producing at least one optical waveguide in the form of a planar structure on a substrate, comprising producing an optical waveguide structure of first and second superposed layers of transparent material on the substrate wherein the second layer is composed of a transparent material which has a greater refractive index and a lower melting point than the material of which the first layer is composed; performing a heating process at a temperature and for a duration so that only the material of the second layer melts and the surface of the molten second layer, when seen in cross section, changes to a shape that at least approximates the arc of a circle; and subsequent to performing a cooling process during which the material of the second layer solidifies in said shape that at least approximates the arc of a circle. With these measures, the optical waveguides receive a cross section that is significantly better suited for coupling to optical fibers. Moreover, a multitude of organic as well as inorganic compounds are available for this type of optical waveguide production. And it is not necessary to employ a monocrystalline material for the substrate. Rather, the substrate may be composed of any desired material. However, it should be selected so that its coefficient of thermal expansion at least approximately corresponds to that of the material from which the optical waveguide is formed.

BRIEF DESCRIPTION OF THE DRAWINGS

Further advantageous details of the invention are defined will now be described with reference to embodiments that are illustrated in the drawing figures in which:

FIGS. 1, 2, 3, 4, 5, 6, 7, 8 and 9 depict the individual method steps if a double coating and removal process is employed;

FIGS. 10, 11, 12, 13 and 14 depict the individual method steps if a single removal process is employed; and FIG. 15 is a sectional front view of an edge at the end face.

DESCRIPTION OF THE PREFERRED EMBODIMENTS

The reference numeral 1 identifies a substrate and reference numeral 2 its surface that serves as the carrier for optical waveguides or integrated optical circuits (FIGS. 1, 10). The substrate is preferably composed of glass or quartz, but other organic or inorganic materials and even metal may also be employed.

A first layer 3 of a transparent material is applied to substrate 1 so as to partially or completely cover its surface 2 (FIG. 2). Additionally, according to FIG. 3, a raised structure 4 is produced on the surface 2 of substrate 1 by covering a portion of the first layer of transparent material defining a structure 4 in the form of the desired optical waveguide—in the illustrated embodiment in the form of a Y branch—and subsequent removal of the non-covered remaining first layer 5 (FIG. 4). If a polymer is employed for first layer 3, the removal of remaining first layer 5 is preferably effected by plasma etching. However, other etching methods or the removal by means of suitable solvents are also conceivable.

Layer 2 may be composed, for example, of a photopolymerizable material and structure 4 may be produced by photolithographic methods known from the production of printed circuits.

If glass is employed for first layer 3, the remaining layer may be removed by etching it away with hydrofluoric acid.

In principle, remaining first layer 5 or a boundary strip along structure 4 may also be removed by treating it with a laser beam or by other suitable methods.

In a further method step, structure 4 and at least a surrounding region of substrate surface 2 are covered with a second transparent layer 6 (FIG. 5). The material for this layer 6 is selected so that it has a lower melting point than the material of first layer 3 and so that, moreover, its refractive index is greater than that of first layer 3. Second layer 6 is advisably applied to a greater thickness than layer 3. For example, the layer thickness of the first layer 3 is about 0.5 to 5 μm.

Then, according to FIGS. 6 and 7, a structure 4.1 is produced in second layer 6 according to the same or a different method as employed for the production of structure 4. This layer is identical to structure 4, possibly with the exception of its width 7. The width 7 of structure 4.1 may be about 70 to 100% of the width of structure 4.

In a subsequent heating process, structure 4.1 in second layer 6 is heated to such a temperature and for such a length of time until it begins to melt and its surface, due to the surface tension of the material, bulges in the form of a circular arc. Thus the cross section of the layer approaches a semi-circle or a circle segment. After cooling, structure 4.1 retains this shape and forms an optical waveguide 8 in the form of a stripline that is well suited for the conduction of light waves and into which or from which light waves can be coupled without problems, due to its favorable cross section (FIG. 8).

To improve or stabilize the optical characteristics of optical waveguide 8, a third transparent layer 9 may be applied in a further method step at least onto optical waveguide 8 (FIG. 9). The refractive index of this third layer is lower than that of the material of second layer 6.

Structures 4 and 4.1 in first layer 3 and second layer 6, respectively may also be produced in a single process step. This method is effected as follows with reference to FIGS. 10 to 14:

Initially, the substrate 1 shown in FIG. 10 is provided with the first layer 3 (FIG. 11). Then, a second layer 6 of a material that melts at a higher temperature and has a greater refractive index than the material of first layer 3 is applied to first layer 3 (FIG. 12). Thereafter, structures 4 and 4.1 are produced through suitable masks or, for example, by photolithographic methods in one method step, for example by plasma etching, laser beam treatment, etc., in that the remaining first and second layers 5 surrounding the structures are removed (FIGS. 13 and 14). Instead of just removing the entire remaining layer, a limited region adjacent to the structures may also be removed, for example, in the form of a channel or strip. The further treatment of this embodiment takes place as described with reference to FIGS. 8 and 9 by way of the heating and cooling process.

In order to realize good coupling of light waves, the end faces 10 of optical waveguide 8 are ground and polished. Advisably, the plane of end faces 10 is sloped, as shown in FIG. 15, by a small angle α at a substrate edge 11 relative to a line 13 that is perpendicular to the plane 12 of substrate 1 so as to avoid undesirable reflections. It should also be mentioned that with this method optical waveguides may be provided on both sides of substrate 1.

If a polymer is employed for the first layer 3 and the second layer 6, the material of the first layer 3, and also that of a possible third layer 9, may be composed of one or several polymers based on polyacrylate, polyimide, high-molecular polycarbonate or polyisocyanate, and the material of second layer 6 may be composed of at least one polymer based on polystyrene, polyurethane, low-molecular polycarbonate.

Inorganic materials employed with preference are glasses that are based on silicon dioxide. Advisably, if silicon dioxide is employed, its percentage is at least 30 weight percent, in particular, higher than 50 weight percent. The glasses may contain up to 30 weight percent lead and/or up to 30 weight percent zinc.

Within the scope of the invention, the first layer 3 may be a layer of an inorganic material and the second layer 6 as well as a possible third layer 9 may be composed of organic material.

The ratio of width to thickness of the structure of first layer 3 is advisably in the range of about 1:1 to 5:1 and that of the second layer 6 is selected to fall into a range of about 0.5:1 to about 2:1.

The width of structure 4.1 in second layer 6 may preferably be 0.7 to 10 μm and the width of the structure 4 of the first layer is about 1 to 10 μm. The thickness of structure 4.1 in second layer 6 is about 1 to 8 μm before it is melted.

Care must be taken in the method that the upper side edges 13 of the structure 4 of the first layer 3 are made as sharp-edged as possible so as to form defined starting locations for the connection of the second layer 6 that melts onto it.

What is claimed is:

1. A method of producing at least one optical waveguide on a substrate, comprising:
   producing an optical waveguide structure of first and second superimposed layers of transparent material on the substrate wherein the
   second layer is composed of a transparent material which has a greater refractive index and a lower melting point than the material of which the first layer is composed;
   performing a heating process at a temperature and for a duration so that only the material of the second layer melts and the surface of the molten second layer, when seen in cross section, changes to a shape that at least approximates the arc of a circle; and
   subsequently performing a cooling process during which the molten material of the second layer solidifies in said shape that at least approximates the arc of a circle.

2. A method according to claim 1, wherein the substrate is initially coated on at least one side with the material of the first layer and thereafter partial regions of said first layer are removed so that a first portion of the optical waveguide structure results; thereafter at least the first portion of the optical waveguide structure and an adjacent surface of the substrate are covered with the second layer and partial regions of the second layer are thereafter removed so that the first portion of the optical waveguide structure formed of the first layer remains coated over 70 to 100% of its width by the second layer; and hereafter said heating process is performed.

3. A method according to claim 1, wherein the substrate is initially coated on at least one side at least over a part thereof with the material of the first layer and this material is subsequently coated with the material of the second layer; thereafter partial regions of both the first and second layers are removed so that said optical waveguide structure is formed; and thereafter said heating process is performed.

4. A method according to claim 1, wherein, after one of said heating process and said cooling process, a coating process is performed in which at least the optical waveguide structure is covered by a transparent material whose refractive index is lower than that of the material of the second layer.

5. A method according to claim 1 wherein a portion of the optical waveguide structure formed by at least one of the first layer and the second layer is produced by covering a portion of the at least one layer with a mask and removing the remaining uncovered regions of the at least one layer by means of a plasma etching process.

6. A method according to claim 3, wherein a portion of the optical waveguide structure formed by at least one of the first layer and the second layer is formed by evaporating the partial regions by means of a laser beam.

7. A method according to claim 1 wherein the material for the first and second layers is a transparent organic material.

8. A method according to claim 7, wherein at least one of the group of materials including polyacrylate, polyimide, high-molecular polycarbonate, and polyisocyanate is employed as the material for the first layer.

9. A method according to claim 7, wherein at least one of the group of materials including polystyrene, polyurethane and low-molecular polycarbonate, is employed as the material for the second layer.

10. A method according to claim 1, wherein a transparent inorganic material is employed as the substrate material and as the material for the first layer.

11. A method according to claim 10, wherein glasses including a percentage of at least 30 weight percent silicon dioxide are employed as the material for at least the first layer and for a third layer which covers the at least one optical waveguide.

12. A method according to claim 11, wherein glasses containing at least one of up to 30 weight percent lead and up to 30 weight percent zinc are employed.

13. A method according to claim 1, wherein a width to thickness ratio of about 1:1 to 5:1 is employed as a cross section for the portion of the optical waveguide structure formed by the first layer.

14. A method according to claim 1, wherein a width to thickness ratio of about 0.5:1 to 2:1 is employed as a cross section for the portion of the optical waveguide structure formed by the second layer when it is in a non-molten state.

15. A method according to claim 1 wherein the portion of the optical waveguide structure formed by the first layer is produced to a width between about 1 and 10 $\mu$m and to a thickness between about 0.5 and 5 $\mu$m, and wherein the portion of the optical waveguide structure formed by the second layer is produced to a width between about 0.7 and 10 $\mu$m and to a thickness between about 1 and 8 $\mu$m in its state before the heating process.

16. A method according to claim 1, wherein the at least one optical waveguide extends to an edge of the substrate and there a face is produced, by one of a grinding and a polishing process, for coupling to an optical fiber.

* * * * *